United States Patent
Satish et al.

(10) Patent No.: US 7,673,139 B1
(45) Date of Patent: Mar. 2, 2010

(54) PROTECTING ADMINISTRATIVE PRIVILEGES

(75) Inventors: Sourabh Satish, Mountain View, CA (US); Harlan Seymour, San Mateo, CA (US)

(73) Assignee: Symantec Corporation, Cupertino, CA (US)

( * ) Notice: Subject to any disclaimer, the term of this patent is extended or adjusted under 35 U.S.C. 154(b) by 1047 days.

(21) Appl. No.: 10/841,840

(22) Filed: May 6, 2004

(51) Int. Cl.
*H04L 20/06* (2006.01)
*G06F 7/04* (2006.01)
*H04L 9/32* (2006.01)

(52) U.S. Cl. .......................... 713/165; 713/167; 726/2; 726/27; 726/28; 726/29

(58) Field of Classification Search ......... 713/165–167; 726/27–29
See application file for complete search history.

(56) References Cited

U.S. PATENT DOCUMENTS

| | | | |
|---|---|---|---|
| 6,760,324 B1 * | 7/2004 | Scott et al. | 370/352 |
| 6,985,944 B2 * | 1/2006 | Aggarwal | 709/224 |
| 7,113,934 B2 * | 9/2006 | Levesque et al. | 707/1 |
| 7,185,075 B1 * | 2/2007 | Mishra et al. | 709/223 |
| 2002/0095499 A1 * | 7/2002 | Barnett et al. | 709/226 |
| 2003/0133556 A1 * | 7/2003 | Naik et al. | 379/201.12 |
| 2003/0212779 A1 * | 11/2003 | Boyter et al. | 709/223 |
| 2004/0133440 A1 * | 7/2004 | Carolan et al. | 705/1 |

OTHER PUBLICATIONS

Sudo, Sudo Main Page, http://www.gratisoft.us/sudo/.

* cited by examiner

*Primary Examiner*—Benjamin E Lanier
(74) *Attorney, Agent, or Firm*—Hunton & Williams LLP

(57) ABSTRACT

A technique is disclosed for protecting a computer system. In one embodiment, the technique comprises configuring a first account with a first privilege and configuring a second account with a second privilege, wherein the first account is restricted at a configured time.

29 Claims, 4 Drawing Sheets

PROTECTING ADMINISTRATIVE PRIVILEGES

FIELD OF THE INVENTION

The present invention relates generally to computer environments. More specifically, protecting a computer system is disclosed.

BACKGROUND OF THE INVENTION

Today's computer systems are vulnerable to security breaches in which an intruder gains unauthorized access to an account. The misuse of highly privileged accounts, such as an administrator account, can cause major problems. An admin or admin account, as used herein, refers to an administrator account, which includes administrative privileges that may not be available to most users. For example, a computer system administrator may use the admin account to perform backup operations or to create new user accounts. These administrative privileges may be abused by an intruder who has somehow gained access to the admin account. Examples of admin accounts include the Unix root account and the Windows admin account.

An intrusion detection system (IDS) or intrusion prevention system (IPS) may help prevent a user from gaining administrator access, but once such access is gained, the ability to detect this unauthorized access is limited. Gaining access to administrative privileges also may compromise the IDS or IPS. A better solution is needed for computer system protection.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
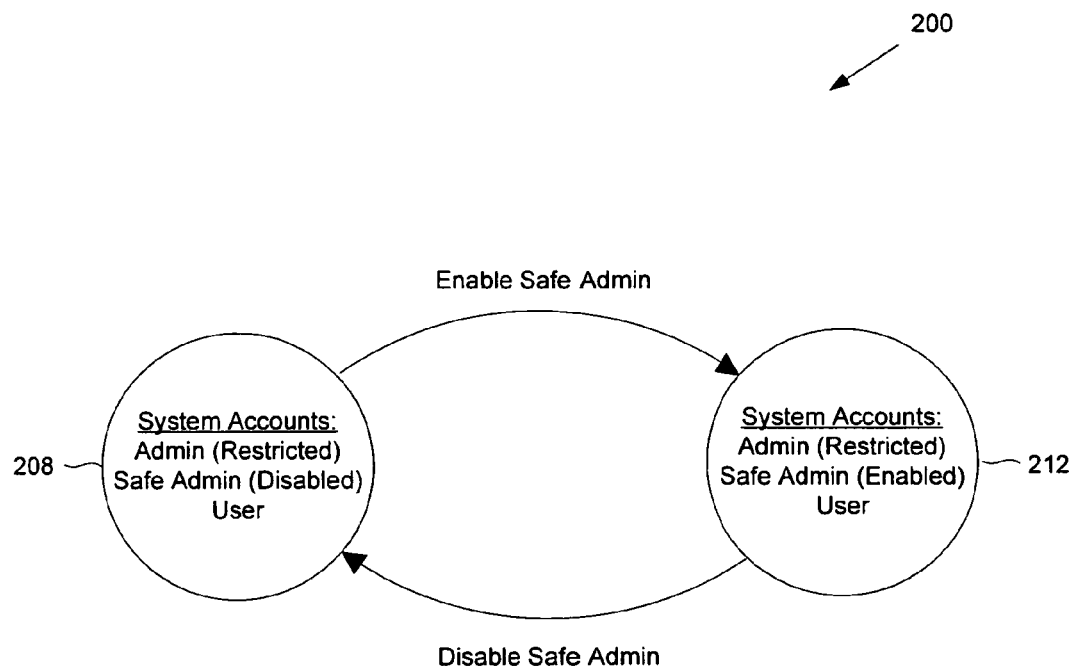
FIG. 1 is a state diagram of a technique used in one embodiment to protect a computer system using a safe admin account.

FIG. 1 is a state diagram of a technique used in one embodiment to protect a computer system using a safe admin account. In this example, a computer system includes an admin account, a safe admin account, and a user account. Various privileges are assigned to these accounts. Examples of privileges include deleting files, installing software, network privileges, debug privileges, creating new accounts, etc. For example, an account may be restricted from deleting files in order to protect the system from unauthorized attempts to delete important files. These accounts may be created and configured by a protection program, a user, or in any other appropriate way. Using a protection program may provide an additional layer of protection.

State diagram 200 is shown to include states 208 and 212. In states 208 and 212, the admin account is restricted. Restricting an account, as used herein, includes restricting, locking, disabling, blocking, or in any way limiting the account or a privilege of the account. For example, the admin account may be assigned a subset of the privileges normally associated with the admin account for the particular system. The restricted admin account may be treated as any other account, and any attempts to exercise unauthorized privileges from the restricted admin account may be suspiciously viewed.

The safe admin account may be assigned a privilege from which the admin account is restricted. In one embodiment, the safe admin account is assigned all the privileges normally associated with the admin account for the particular system. The safe admin account is disabled outside of configured times. In state 208, the admin account is disabled. In state 212, the admin account is enabled. The transitions between states are described in conjunction with FIG. 2.

Figure 2:
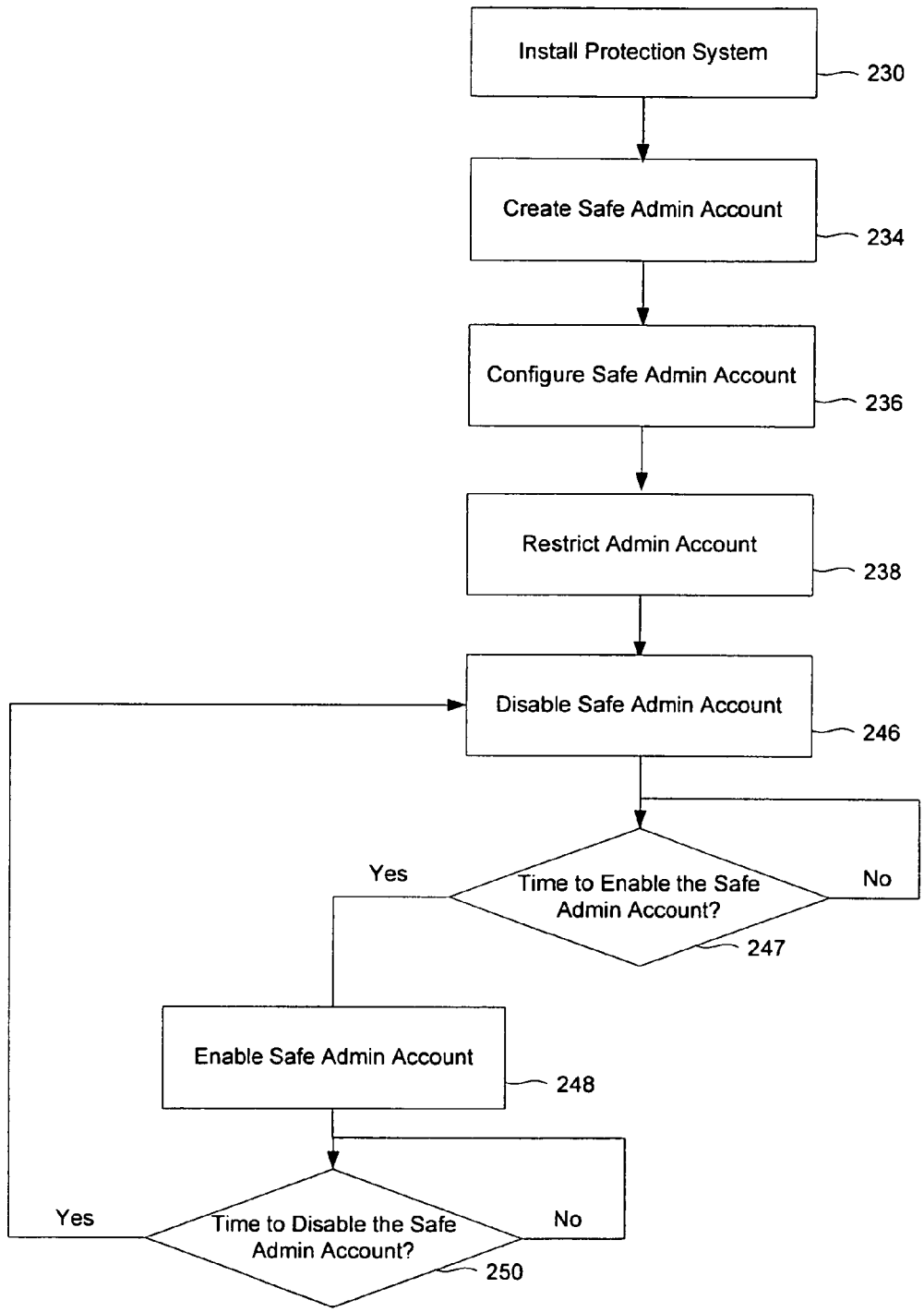
FIG. 2 is a flowchart of a technique used in one embodiment to protect a computer system using a safe admin account.

FIG. 2 is a flowchart of a technique used in one embodiment to protect a computer system using a safe admin account. Optionally, a protection program, such as an IDS or IPS is installed (230). In one embodiment, the protection program is installed under an admin account.

A safe admin account is created (234). The safe admin account refers to an account that has a higher privilege than a restricted admin account. For example, a safe admin account may be allowed to install all software, but a restricted admin account may only be allowed to install certain types of software. The safe admin account is configured (236). Configuring may include specifying the safe admin account privileges and selecting times when the safe admin account should be enabled for use. For example, control of the protection program may be given to the safe admin account so that only the safe admin account is allowed to stop the protection program. Full administrative privileges may be given to the safe admin account. A safe admin session may be scheduled at regular or irregular intervals. The safe admin account may be configured by a protection program such as an IDS or IPS, a user, or any other appropriate means. In addition, the name of the safe admin account may be configured. Further examples of configurable properties include usage patterns, privileges, actions to take during the session, and actions to take at the end of the session. For example, these may be displayed on tabbed pages within a GUI during safe admin account configuration, as further described below.

Examples of usage patterns that may be configured include usage session attributes, such as what time of the day, week, or month, the session will be used, and scheduled session attributes, such as how to securely schedule temporary access at a future time with a given duration.

Examples of privileges that may be configured include the privilege to: launch certain processes, such as a software installation process; escalate privileges, or give the safe admin account higher privileges; create highly privileged accounts; start more than a certain number of simultaneous sessions; start interactive or remote sessions; control protection program functionality; and extend the usage duration of the safe account, and whether to allow a grace period. For example, the safe admin account may be configured to allow no more than a certain number of safe admin sessions simultaneously. A safe admin account may be given exclusive privilege to control protection program functionality. This enhances system security since an attacker may first try to stop the protection program as soon as he gets admin privileges. Because the admin account does not have the privilege to stop the protection program, the protection program is secured and the protection program can then monitor the misuse of the admin account and convict the attacker.

Further examples of privileges that may be configured include the privilege to: install new software; access external physical media; create, delete, move, or rename files; alter or patch binaries; access the Internet, such as download or install files from the Internet; and control network access, such as FTP, HTTP, or SMTP network access. For example, the safe admin account may be allowed to install software that needs to be run under highly privileged accounts. An example of a privilege to access external physical media includes allowing the safe admin account to read or write to temporary storage media, such as a USB disk, floppy disk, tapes, CD-ROM, DVD-ROM, or network drive, or to access a network printer.

Examples of actions to take during the session that may be configured include recording the session, logging the session, and authenticating the session. For example, a session may be authenticated using a challenge-response system. The protection program asks the user random questions that are preconfigured so that illegitimate users are not authenticated. Alternatively, social engineering authentication may be used. In this example, certain activities are carried out in a certain order and duration to authenticate the user. For example, when the safe admin logs in, the calculator application must be opened and closed three times in succession, otherwise the session automatically logs off. In another example, the user must open Notepad, open Explorer, close Notepad, and close Explorer, in that exact order and over a certain duration, in order to authenticate the user. Another example of actions to take during the session that may be configured includes restricting the session or grace period for CPU usage, network usage, or disk I/O usage.

Examples of actions to take at the end of the session that may be configured include terminating the session, killing all processes of the session, logging off the user, logging or alerting the session termination, and lowering privileges, such as the privilege to install software from the Internet.

Returning to FIG. 2, the admin account is restricted (238). There are various ways to restrict the admin account. In one embodiment, a learn-based modeling method is used to select the privileges of the admin account. The admin account is profiled for a certain period of time, such as 30 days. After that time, the admin account privileges are restricted to those privileges it exercised during the profiling period. Frequently performed activities, such as running word processing or spreadsheet programs, that occur during the profiling period are available to the restricted admin account. Infrequently performed activities, such as backup operations or quarterly reports, may not be available to the restricted admin account. These privileges may instead be assigned to the safe admin account.

In one embodiment, the privileges of both the admin account and safe admin account are configured using a graphical user interface (GUI). For example, a GUI within the protection program may open that displays a list of all available privileges. Examples of available privileges are listed above. The user then selects from the list those privileges that should be available to the restricted admin and those privileges that should be available to the safe admin. Some privileges may be made available to both the restricted admin and the safe admin. For example, a user may choose to have Internet access made available to both the restricted admin and the safe admin. Other privileges may be made available only to the safe admin. For example, a user may choose to make control of the protection program available only to the safe admin.

The safe admin account is then disabled (246), and the system is in state 208. It is determined if it is time to enable the safe admin account (247). The time to enable the safe admin account is configured by the user as described above. If it is determined that it is not time to enable the safe admin account, the safe admin account remains disabled in state 208, and the determination (247) is made again. If it is determined it is time to enable the safe admin account, the safe admin account is enabled (248) and the system transitions to state 212. In state 212, safe admin account privileges may be exercised. Also, the configuration, which may be under the control of the safe admin account only, may be modified. For example, the user may decide to change the privileges or the times when the safe admin account should be enabled.

It is determined if it is time to disable the safe admin account (250). The time to disable the safe admin account is configured by the user. If it is determined it is not time to disable the safe admin account, the safe admin account remains enabled in state 212, and the determination (250) is made again. If it determined it is time to disable the safe admin account, the safe admin account is disabled (246) and the system transitions back to state 208. Accordingly, the system transitions back and forth between states 208 and 212 according to the configured times when the safe admin account should be enabled for use.

The order of the above events may be altered. For example, the safe admin account may be created (234) after restricting the admin account (238). Also, the protection program may be installed (230) at any point during the process. For example, the protection program may be installed after the safe admin account is created and configured. The protection program may be installed under the safe admin account and control of the protection program made available only to the safe admin. The protection program could be configured to run under the safe admin account. The protection program can enforce appropriate usage and privileges of the safe admin account and its enabling and disabling. Also, the protection program can monitor and enforce restricted use of a conventional admin account. Installing a protection program is optional. For example, the admin account may create (234) and configure (236) the safe admin account, and restrict the admin account (238).

In some embodiments, the safe admin account is created and deleted each time a scheduled period begins and ends. Each time the account is created, account information, such as username and password, may be communicated in various ways. For example, the protection program may use a secure channel to communicate this information; the user may be given safe admin access for a single session by supplying his password and answering a challenge response question; or a fixed username and password that is configurable by the protection program may be used, where the fixed username and password expire after a certain time.

Figure 3:
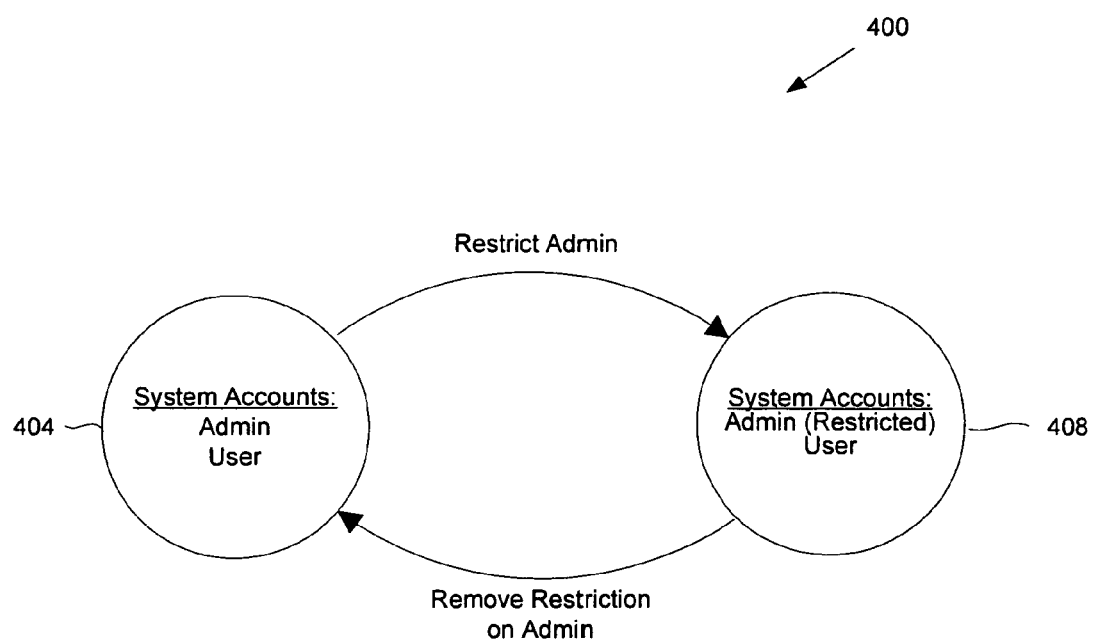
FIG. 3 is a state diagram of a technique used in one embodiment to protect a computer by restricting an admin account.

In some embodiments, rather than creating a separate safe admin account, the admin account is configured so that certain privileges are restricted to select times. FIG. 3 is a state diagram of a technique used in one embodiment to protect a computer by restricting an admin account. In this example, state diagram 400 is shown to include states 404 and 408. In state 404, the system includes an admin account and a user account. In state 408, the system includes a restricted admin account and a user account. The transitions between states are described in conjunction with FIG. 4.

Figure 4:
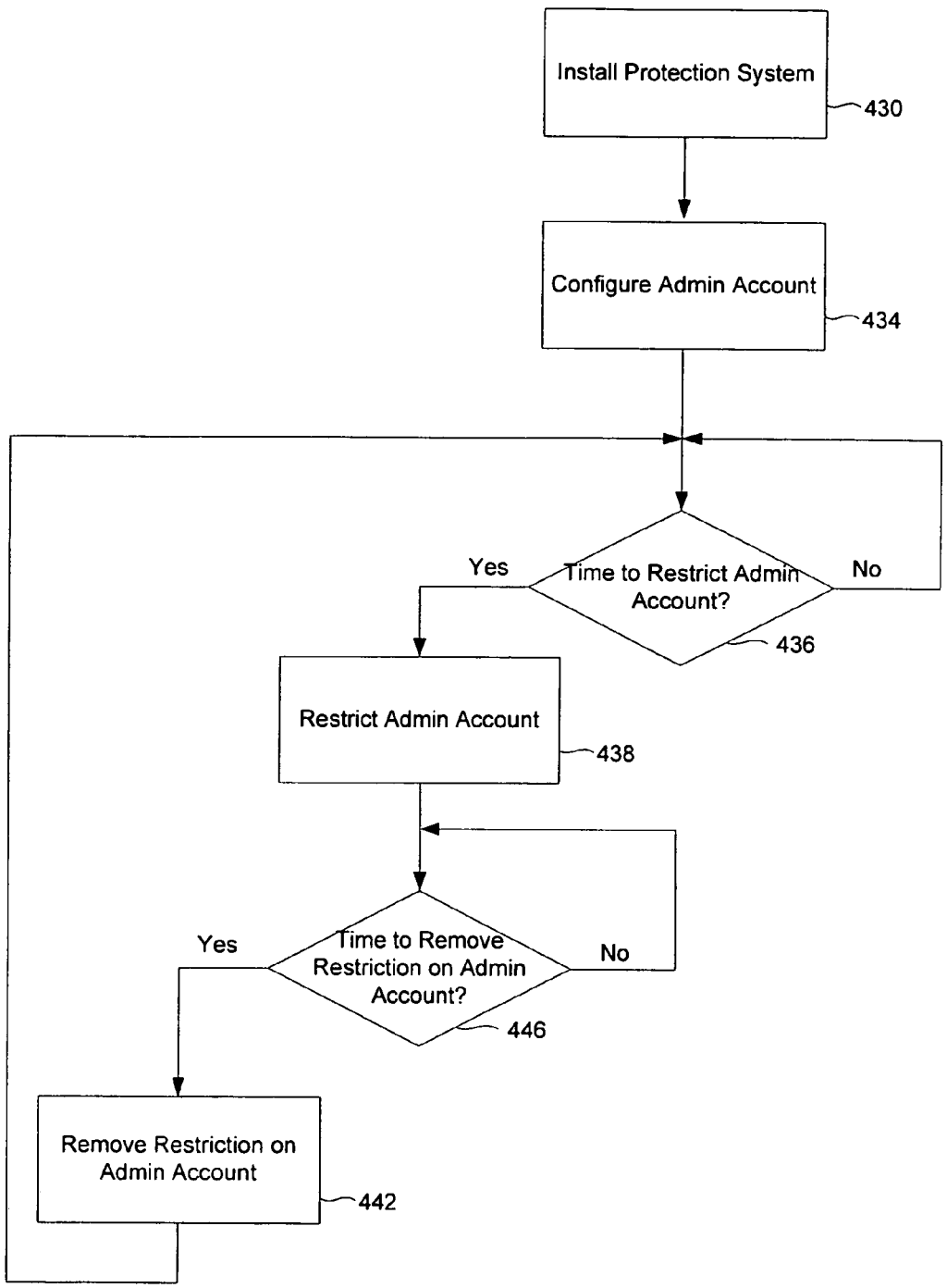
FIG. 4 is a flowchart of a technique used in one embodiment to protect a computer by restricting an admin account.

FIG. 4 is a flowchart of a technique used in one embodiment to protect a computer by restricting an admin account. In this example, initially, the system is in state 404. Optionally, a protection program, such as an IDS or IPS is installed (430). In one embodiment, the protection program is installed under an admin account. The admin account is configured (434). Configuring may include specifying the restricted admin account privileges and selecting times when the admin account should be restricted. For example, control of the protection program may be restricted to a certain time each day. Any of the configurable properties listed earlier may also be configurable properties of the restricted admin account.

It is determined whether it is time to restrict the admin account (436). If it is determined that it is not time to restrict the admin account (436), the system remains in state 404 and the determination (436) is made again. If it determined that it is time to restrict the admin account, the admin account is restricted (438), and transitions to state 408.

It is determined whether it is time to remove the restriction on the admin account (446). If it is determined that it is not time to remove the restriction on the admin account, the system remains in state 408, and the determination (446) is made again. If it is determined that the restriction should be removed, the admin account restriction is removed (442) and the system transitions to state 404. During state 404, administrative privileges may be exercised. Also, the configuration, which may be under the control of the admin account only, may be modified. For example, the user may decide to change the privileges or the times when the admin account should be enabled. When it is time to restrict the admin account (436), the admin account is again restricted (438) and the system transitions back to state 408. Accordingly, the system transitions back and forth between states 404 and 408.

The order of the above events may be altered. For example, the protection program may be installed (430) at any point during the process, such as after the admin account is configured (434). Installing a protection program (430) is optional.

In some embodiments, the admin account is enabled and disabled each time a scheduled period begins and ends. In other embodiments, the admin account is created and deleted each time a scheduled period begins and ends. Each time the account is created, account information, such as username and password, may be communicated in various ways, as previously described.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer implemented method of protecting a computer system, comprising:
    configuring a safe admin account in the computer system with a first set of privileges that are administrative privileges not available to a user account;
    profiling usage of the safe admin account for a prescribed period of time;
    identifying an exercised set of privileges that were exercised during the prescribed period of time;
    determining a second set of privileges based at least in part on the identified exercised set of privileges, the second set of privileges being a subset of the first set of privileges;
    configuring a restricted admin account in the computer system with the second set of privileges;
    determining automatically that a configured time to enter a restricted state has arrived;
    restricting the safe admin account automatically based at least in part on said determination that the configured time has arrived;
    determining automatically that a configured period associated with the configured time has ended; and
    removing the restriction on the safe admin account based at least in part on the determination that the configured period has ended.

2. The method of claim 1, wherein restricting the first account includes disabling the safe admin account and removing the restriction on the safe admin account includes enabling the first account.

3. The method of claim 1, wherein restricting the safe admin account includes deleting the safe admin account and removing the restriction on the safe admin account includes creating the safe admin account.

4. The method of claim 1, wherein the configured period is specified by a protection program configuration.

5. The method of claim 1, wherein the safe admin account has all available administrative privileges.

6. The method of claim 1, wherein the safe admin account is allowed to control a process.

7. The method of claim 1, wherein the restricted admin account is not allowed to control a process.

8. The method of claim 1, wherein the safe admin account is allowed to create an account.

9. The method of claim 1, wherein the restricted admin account is not allowed to create an account.

10. The method of claim 1, wherein the safe admin account is allowed to delete a file.

11. The method of claim 1, wherein the restricted admin account is not allowed to delete a file.

12. The method of claim 1, wherein the safe admin account is allowed to install software.

13. The method of claim 1, wherein the restricted admin account is not allowed to install software.

14. The method of claim 1, wherein the safe admin account is allowed to configure a protection program and the restricted admin account is not allowed to configure the protection program.

15. The method of claim 1, further including configuring a protection program to configure one or more of the safe admin account and the restricted admin account.

16. The method of claim 1, wherein the safe admin account name is configured.

17. A computer implemented method of protecting a computer system, comprising:
    configuring an account in the computer system with a privilege, wherein the privilege is determined based at least in part upon a set of privileges that were exercised during a prescribed period of time when account usage in the computer system is profiled;

determining automatically that a configured time to enter a restricted state has arrived;

restricting the account, automatically based at least in part on said determination that the configured time has arrived, by restricting the account from performing an action associated with the privilege while allowing the account to perform one or more actions associated with one or more other privileges;

determining automatically that a configured period associated with the configured time has ended; and removing the restriction on the account based at least in part on the determination that the configured period has ended;

wherein removing the restriction results in the account not being restricted from performing the action associated with the privilege.

18. The method of claim 17, wherein the account is an admin account having one or more administrative privileges not available to a user account.

19. The method of claim 17, wherein a protection program restricts the privilege.

20. The method of claim 17, further including configuring a protection program.

21. The method of claim 17, wherein a protection program controls the account.

22. A computer program product for protecting a computer system, the computer program product being embodied in a computer readable storage medium and comprising computer instructions for:

configuring a safe admin account with a first set of privileges that are administrative privileges not available to a user account;

profiling usage of the safe admin account for a prescribed period of time;

identifying an exercised set of privileges that were exercised during the prescribed period of time;

determining a second set of privileges based at least in part on the identified exercised set of privileges, the second set of privileges being a subset of the first set of privileges;

configuring a restricted admin account with the second set of privileges;

determining automatically that a configured time to enter a restricted state has arrived;

restricting the safe admin account automatically based at least in part on said determination that the configured time has arrived;

determining automatically that a configured period associated with the configured time has ended; and removing the restriction on the safe admin account based at least in part on the determination that the configured period has ended.

23. A system for protecting a computer system, comprising:

a processor configured to:

configure a safe admin account with a first set of privileges that are administrative privileges not available to a user account;

profile usage of the safe admin account for a prescribed period of time;

identify an exercised set of privileges that were exercised during the prescribed period of time;

determine a second set of privileges based at least in part on the identified exercised set of privileges, the second set of privileges being a subset of the first set of privileges;

configure a restricted admin account with the second set of privileges;

determine automatically that a configured time to enter a restricted state has arrived;

restrict the safe admin account automatically based at least in part on said determination that the configured time has arrived;

determine automatically that a configured period associated with the configured time has ended; and remove the restriction on the safe admin account based at least in part on the determination that the configured period has ended; and a memory coupled with the processor, wherein the memory provides the processor with instructions.

24. The method of claim 1, further including identifying the frequency at which each of the identified set of privileges was exercised during the profiling period.

25. The method of claim 24, wherein determining the second set of privileges is based at least in part on the identified frequencies.

26. The method of claim 1, wherein the safe admin account is allowed to configure the configured time or the configured period and the restricted admin account is not allowed to configure the configured time or the configured period.

27. The method of claim 1, wherein the safe admin account is allowed to configure the first set of privileges or the second set of privileges and the restricted admin account is not allowed to configure the first set of privileges or the second set of privileges.

28. The method of claim 17, wherein the privilege is an administrative privilege not available to a user account.

29. The method of claim 17, wherein the account is an admin account, and wherein when the account is restricted, the account still has at least one privilege not available to a user account.

* * * * *